Sept. 11, 1923.  
U. ILICH  
AUTOMOBILE BUMPER  
Filed March 6, 1923  
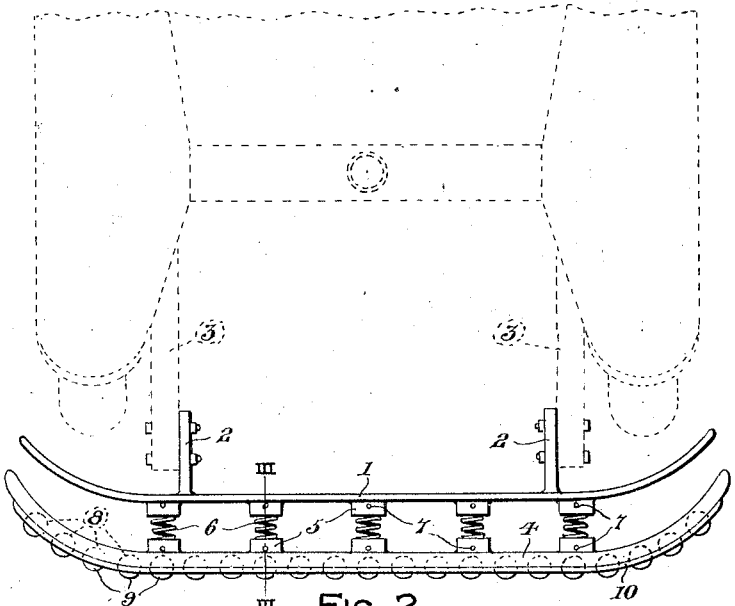
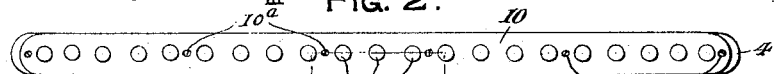
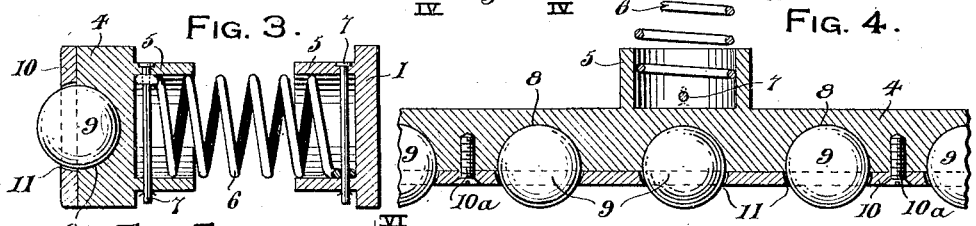
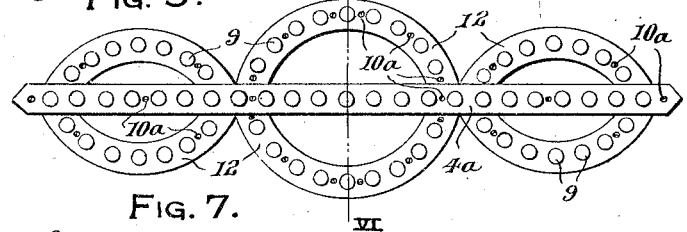
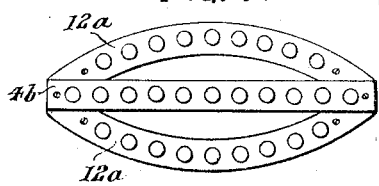
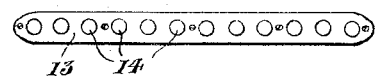

Patented Sept. 11, 1923.

1,467,640

UNITED STATES PATENT OFFICE.

USTOS ILICH, OF SAN DIEGO, CALIFORNIA.

AUTOMOBILE BUMPER.

Application filed March 6, 1923. Serial No. 623,150.

*To all whom it may concern:*

Be it known that I, USTOS ILICH, a citizen of Yugoslavia, residing at San Diego, in the county of San Diego and State of California, have invented certain new and useful Improvements in Automobile Bumpers, of which the following is a specification.

This invention relates to certain new and useful improvements in automobile bumpers, and has for one of its objects to provide a bumper of the cushion type that is resiliently mounted for the purpose of absorbing shocks and jars, in addition to providing a protection for the front end of an automobile.

Another object of the invention is to provide an automobile bumper of the type above described, wherein the outer face of the bumper supports a plurality of loosely mounted bearing balls retained in position upon the outer face of the bumper and adapted for rolling contact with objects abutted.

It is also intended that a bumper or shield of the above type be designed and constructed for mounting upon the sides of a boat or the outer edge of the running board of an automobile to provide the desired protection therefor.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a top plan view of an automobile bumper constructed in accordance with the present invention, the front end of an automobile being illustrated by dotted lines.

Figure 2 is a front elevational view of the cushioned bar of the bumper showing the sockets therein for the reception of the bearing balls, Figure 3 is a detail sectional view taken on line III—III of Fig. 1 showing the rigid and resiliently mounted bumper bar and a bearing ball loosely supported in the cushion bumper bar, Figure 4 is a detail sectional view taken on line IV—IV of Fig. 2 showing the retaining plate for the bearing balls, Figure 5 is a front elevational view of a modified form of bumper, Figure 6 is a detail sectional view taken on line VI—VI of Fig. 5, Figure 7 is a front elevational view of another form of bumper, and Figure 8 is a front elevational view of a protecting bar adapted for mounting upon the outer edge of the running board of an automobile.

Referring more in detail to the accompanying drawing, there is illustrated a bumper for automobiles including a cross bar 1 of the usual design carrying a rearwardly directed bracket arm 2 adjacent each end thereof adapted to be bolted to the forward ends of the chassis bars 3 of the automobile.

A resiliently mounted bumper bar 4 is supported forwardly of the bar 1, the same being of the same general design, the opposed faces of the bumper bar sections 1 and 4 being provided with tubular extensions 5 arranged in alined pairs as shown in Fig. 1 to receive the opposite ends of coil springs 6 that are anchored therein by the cross pins 7, the resiliently mounted bumper bar 4 supported forwardly of the bumper bar section 1 by the coil springs 6.

The outer face of the bumper bar 4 is provided with a plurality of spaced hemispherical sockets 8 within which bearing balls 9 are received, a retaining plate 10 having spaced openings 11 being secured by the screws 10ª to the outer face of the bar 4 with the outer sides of the balls 9 projecting through the plate openings 11 and retained therein in a manner as clearly illustrated in Fig. 4.

From the above detail description of the device, it is believed that the construction and operation thereof will at once be apparent, it being noted that the resiliently mounted bumper bar 4 being positioned forwardly of the bumper bar section 1 will absorb the shocks and jars when engaging an object, while the loosely mounted bearing balls 9 will further tend to eliminate serious damage by permitting relative movement between the bumper bar 4 and an engaged object.

In the form of the invention shown in Figs. 5 and 6, the resiliently mounted bumper bar includes a cross bar section 4ª having arched bars 12 positioned above and beneath the same, the outer faces of the bars 4ª and 12 supporting bearing balls 9 as clearly shown in Fig. 6, the arched bars 12 being arranged, preferably in three groups as shown in Fig. 5.

In the form of the invention shown in Fig. 7, there is provided a central resiliently mounted bumper bar 4ᵇ having a single arched bar 12ª positioned above and another below the same and connected at their ends to the transverse bumper bar 4ᵇ, each of the bars supporting bearing balls 9.

It is also intended that the outer edge of a running board of an automobile be equipped with a protecting bar of this type, there being illustrated in Fig. 8, a bar 13 supporting bearing balls 14, the bar being rigidly connected to the outer edge of the running board.

This type of bumper bar is also capable of being constructed for association with the side walls of the hull of a ship for protecting the same when running into the slip of a wharf, and various other uses are also contemplated.

While there are herein shown and described the preferred embodiments of the present invention, it is nevertheless to be understood that minor changes may be made therein without departing from the spirit and scope of the invention as claimed.

What is claimed as new is:—

1. In an automobile bumper of the type described, a rigidly mounted bumper bar and another resiliently mounted bumper bar positioned forwardly of the rigid bar, and bearing balls secured to the outer face of the resiliently mounted bumper bar.

2. In an automobile bumper of the type described, a rigidly mounted bumper bar and another resiliently mounted bumper bar positioned forwardly of the rigid bar, the resilient mounting including coil springs interposed between the two bumper bars, and bearing balls secured to the outer face of the resiliently mounted bumper bar.

In testimony whereof I affix my signature.

USTOS ILICH.